United States Patent
Yun et al.

(10) Patent No.: US 8,635,379 B2
(45) Date of Patent: Jan. 21, 2014

(54) DATA STORAGE DEVICE AND METHOD OF OPERATING THE SAME

(75) Inventors: Hyoung-Jin Yun, Suwon-si (KR); Wooseok Chang, Seongnam-si (KR); Youngdok Kim, Gwacheon-si (KR); Hyeyoung Kim, Seoul (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 118 days.

(21) Appl. No.: 13/102,216

(22) Filed: May 6, 2011

(65) Prior Publication Data

US 2011/0276725 A1    Nov. 10, 2011

(30) Foreign Application Priority Data

May 7, 2010    (KR) .................... 10-2010-0043069

(51) Int. Cl.
*G06F 3/00*    (2006.01)
*G06F 13/12*    (2006.01)

(52) U.S. Cl.
USPC .............................................. 710/15; 710/74

(58) Field of Classification Search
USPC ........................................................ 710/15
See application file for complete search history.

(56) References Cited

U.S. PATENT DOCUMENTS

| 5,603,066 A * | 2/1997 | Krakirian ........................ 710/74 |
| 5,640,593 A | 6/1997 | Krakirian |
| 5,752,083 A | 5/1998 | Krakirian |
| 5,781,803 A * | 7/1998 | Krakirian ........................ 710/74 |
| 5,845,154 A * | 12/1998 | Krakirian ........................ 710/74 |
| 7,472,158 B2 * | 12/2008 | Galloway ....................... 709/203 |
| 2005/0235072 A1 * | 10/2005 | Smith et al. ..................... 710/22 |
| 2006/0107130 A1 | 5/2006 | Baker et al. |

* cited by examiner

*Primary Examiner* — Titus Wong
(74) *Attorney, Agent, or Firm* — Stanzione & Kim, LLP

(57) ABSTRACT

A data storage device includes a data storage device controller configured to control a storage medium, and a tag duplicate check unit to determine, when a frame is received from an initiator, the initiator, tag information, and a type of the sent frame and providing an interrupt to the data storage device controller if a same frame type and same tag information are received from a same initiator.

11 Claims, 11 Drawing Sheets

Fig. 3

| Code | Name of Frame | Type of Information Unit(IU) | Originator |
|---|---|---|---|
| 01h | DATA Frame (i.e., write DATA frame or read DATA frame) | Data Information Unit (i.e., write data information unit or read data information unit) | Initiator Or Target |
| 05h | XFER_RDY Frame | Transfer Ready Information Unit | Target |
| 06h | COMMAND Frame | Command Information Unit | Initiator |
| 07h | RESPONSE Frame | Response Information Unit | Target |
| 16h | TASK Frame | Task Management Function Information Unit | Initiator |

DATA STORAGE DEVICE AND METHOD OF OPERATING THE SAME

CROSS-REFERENCE TO RELATED APPLICATIONS

This application claims priority, under 35 U.S.C §119, of Korean Patent Application No. 10-2010-0043069 filed May 7, 2010, the entirety of which is incorporated by reference herein.

BACKGROUND OF REINVENTION

1. Field of the Invention

Exemplary embodiments relate to an electronic device, and more particularly, relate to a data storage device and an operating method thereof.

2. Description of the Related Art

In computer systems, host may be interconnected with peripheral devices, such as data storage device, printer, scanner, etc., via the standardized interface. The standardized interface means the protocol with respect to a command set and mechanical and electrical requirements necessary to interconnect host and peripheral devices.

The standardized interface for interconnecting host and peripheral devices may include various interfaces: Advanced Technology Attachment (ATA) interface, Serial ATA (SATA) interface, external SATA (e-SATA) interface, Small Computer Small Interface (SCSI), Serial Attached SCSI (SAS), Peripheral Component Interconnection (PCI) interface, PCI-Express (PCI-E) interface, IEEE 1394 interface, Universal Serial Bus (USB) interface, Secure Digital (SD) card interface, Multi Media Card (MMC) interface, embedded MMC (eMMC) interface, Compact Flash (CF) card interface, and the like.

Among the above interfaces, SCSI and SAS interfaces are widely used at server or workstation. SAS interface may interconnect host and peripheral devices via SCSI command sets. SCSI interface may utilize parallel transfer manner which uses a plurality of signal lines. In case of parallel transfer manner, a problem may arise due to a plurality of signal lines when a clock frequency becomes higher to transfer signals in a high speed. For example, the program may include the skew that data signals simultaneously transferred from a transmitter side via a plurality of signal lines are dispersed and then dispersed data signals arrive at a receiver side. Alternatively, the program may include crosstalk that interference arises due to mutual induction among data signals transferred via a plurality of signal lines.

As improved SCSI interface, SAS interface may use serial transfer manner to overcome problems caused by parallel transfer manner. Accordingly, SAS interface may interconnect host and peripheral devices via SCSI command sets and may use serial transfer manner where single signal fine is adopted. SAS interface may use a high clock frequency to conduct high-speed transmission.

With SCSI interface, one SCSI bus connected with host can be shared by a plurality of peripheral devices. On the other hand, with SAS interface, respective peripheral devices can be connected to one SAS bus in a point-to-point manner. With SCSI and SAS interfaces, host may transfer new command to peripheral device before there is received information indicating that command previously transferred from peripheral device is completed. Accordingly, host and peripheral device connected via SCSI or SAS interface may grant unique identifiers to commands in order to manage and perform command.

SUMMARY OF THE INVENTION

Embodiments of the present general inventive concept provide a data storage device, an electronic apparatus having the same, and a method thereof.

Additional aspects and advantages of the present general inventive concept will be set forth in part in the description which follows and, in part, will be obvious from the description, or may be learned by practice of the general inventive concept One feature and utilities of embodiments of the inventive concept are directed to provide a data storage device including a data storage device controller configured to control a storage medium, and a tag duplicate check unit to determine, when a frame is received from an initiator, the initiator, tag information, and a type of the sent frame and to provide an interrupt to the data storage device controller if a same frame type and same tag information are received from a same initiator.

Another feature and utilities of embodiments of the inventive concept are directed to provide an operating method of a data storage device which includes the data storage device including a data storage device controller to control a storage media, and a tag duplicate check unit. The operating method may further include receiving a frame from an initiator by the tag duplicate check unit, determining a type of the received frame, generating tag check data based on the received frame, comparing the generated tag check data with previously stored tag check data, and providing an interrupt to the data storage device controller by the tag duplicate check unit, when the generated tag check data is identical to previously stored tag check data.

One feature and utilities of embodiments of the inventive concept are directed to provide a data storage device including a storage medium, and a controller to receive a first frame from an initiator, to control the storage medium according to the received first frame, to receive a second frame from the initiator, to determine initiator information, tag information, and frame type information of the first frame and the second frame, and to provide an interrupt to the data storage device controller when the frame type and tag information are same received from the initiator.

One aspect feature and utilities of embodiments of the inventive concept are directed to provide an electronic apparatus including an initiator to generate a first frame and a second frame, and a data storage device connected to the initiator through an interface, the data storage device including a storage medium, and a controller to receive the first frame from the initiator, to control an operation of the storage medium according to the received first frame, to receive the second frame from the initiator, to determine initiator information, tag information, and frame type information of the first frame and the second frame, and to provide an interrupt to the data storage device controller when the frame type and tag information of the first frame and the second frame received from the initiator are same, without controlling another operation of the storage medium according to the second frame.

BRIEF DESCRIPTION OF THE DRAWINGS

The above and other objects and features of the general inventive concept will become apparent from the following description with reference to the following figures, wherein like reference numerals refer to like parts throughout the various figures unless otherwise specified, and wherein

FIG. 3 is a diagram showing frame types of SCSI and SAS interfaces.

DETAILED DESCRIPTION OF THE PREFERRED EMBODIMENTS

Figure 1:
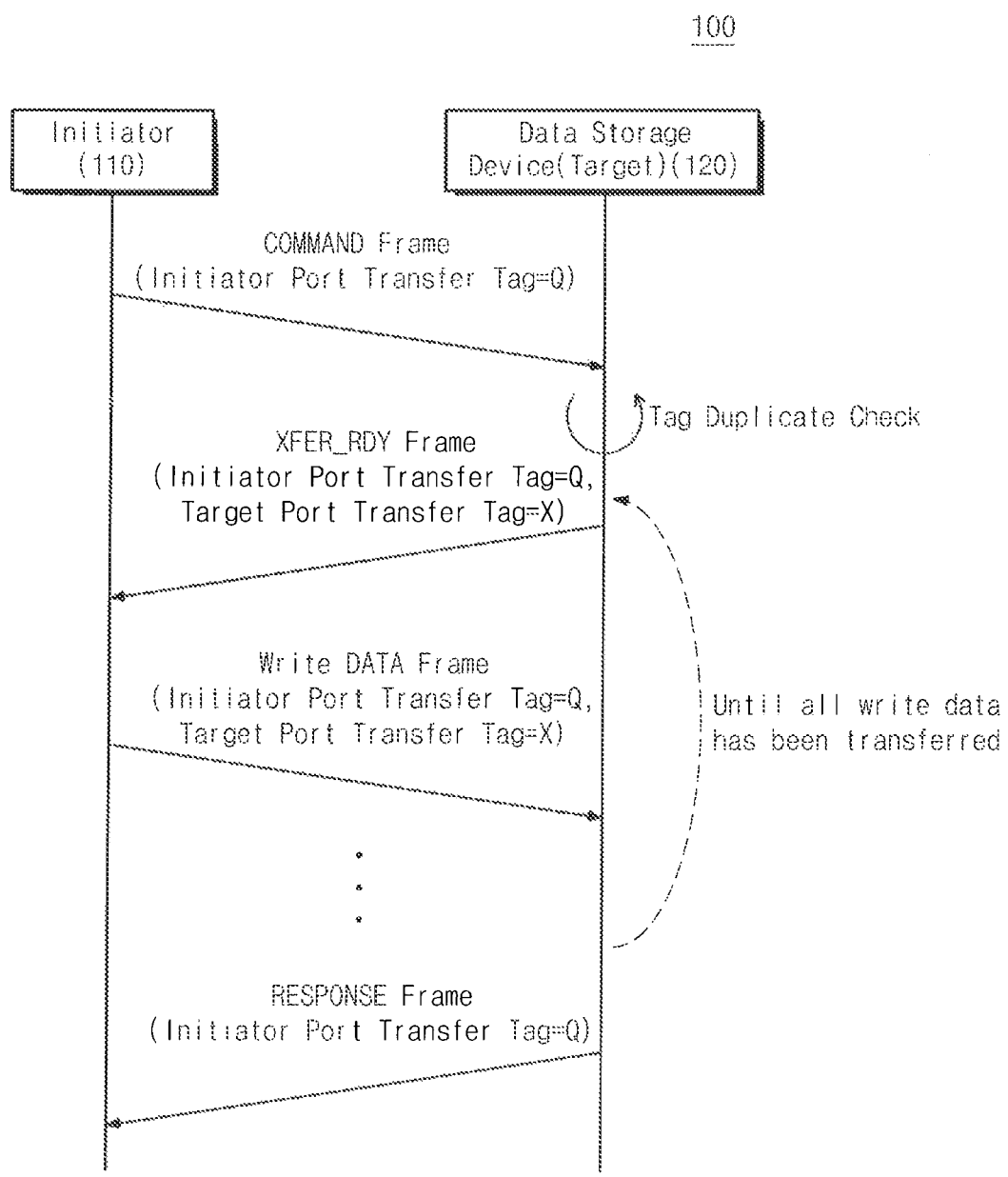
FIG. 1 is a flow chart showing an operation of a user device according to an exemplary embodiment of the inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the inventive concept.

Spatially relative terms, such as "beneath", "below", "lower", "under", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the exemplary terms "below" and "under" can encompass both an orientation of above and below. The device may be otherwise oriented (rotated 90 degrees or at other orientations) and the spatially relative descriptors used herein interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It will be understood that when an element or layer is referred to as being "on", "connected to", "coupled to", or "adjacent to" another element or layer, it can be directly on, connected, coupled, or adjacent to the other element or layer, or intervening elements or layers may be present. In contrast, when an element is referred to as being "directly on," "directly connected to", "directly coupled to", or "immediately adjacent to" another element or layer, there are no intervening elements or layers present.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

FIG. 1 is a flow chart showing an operation of a user device 100 according to an exemplary embodiment of the inventive concept.

The user device 100 according to an exemplary embodiment of the inventive concept includes an initiator 110 and a data storage device 120 as a target. In the user device 100, an initiator and a target may be interconnected via a SCSI or SAS interface which utilizes SCSI command sets. The initiator may be a device which provides a command to another device so as to perform or control an operation thereof, and the target indicates a device which is provided with commands. The initiator may be a host (or host computer).

One user device can include a plurality of initiators. Further, an initiator may become a target if necessary, and vice versa. With the SAS and SCSI interfaces, one initiator may be interconnected with a plurality of targets. An initiator may transmit a new command to a target before receiving from a target a notification indicating that a previously transmitted command is completed. When a plurality of initiators and a plurality of targets are interconnected via the SAS or SCSI interface, each initiator/target assigns identifiers to corresponding commands such that each target/initiator can determine whether a command is generated or transmitted from any initiator/target and discriminates each command. Each initiator/target manages and performs commands using the assigned unique identifiers. The unique identifier is referred to as a tag.

Referring to FIG. 1, a flow chart illustrates the initiator 110 requesting a write operation to the data storage device 120. The initiator 110 sends a command frame requesting a command to the data storage device 120. The initiator 110 may send initiator information before the command frame is transferred, such that the data storage device 120 discriminates which initiator requests a command. The command frame from the initiator 110 may include tag information (Initiator Port Transfer Tag=Q) to discriminate a command.

If the command frame is received, the data storage device 120 checks tag information in the command frame. That is, the data storage device 120 checks whether a command is requested from an initiator and whether commands having the same tag information are included in commands requested by one initiator. An operation where the data storage device 120 checks tag information is referred to as a 'tag duplicate check'.

In accordance with embodiments of the inventive concept, the data storage device 120 performs the tag duplicate check operation when a command frame is received. As another example, the data storage device 120 performs the tag duplicate check operation when a task frame is received. Herein, the task frame may be a command to manage a command sent from the initiator 110. The data storage device 120 may perform the tag duplicate check operation using a hardware device. That is, the data storage device 120 may include a tag duplicate check unit to perform the tag duplicate check operation. The data storage device 120 compares tag information of a newly received command with tag information of a previously received command, and generates tag check data as a comparison result. If duplicated tags are detected, the data storage device 120 notifies the initiator 110 that an error occurs. If no duplicated tags are detected, the data storage device 120 stores tag information on a new received command in order to check tag information on a next command to be received later.

As a response to a received command (for example, a write command), the data storage device 120 may transfer to the initiator 110 a transfer ready frame XFER_RDY Frame indicating that there is ready to perform a write operation. The transfer ready frame XFER_RDY Frame may include tag information (Initiator Port Transfer Tag=Q) from an initiator and tag information (Target Port Transfer Tag=X) from a data storage device.

The initiator 110 transmits data to be stored in the data storage device 120 in response to an input of the transfer ready frame XFER_RDY Frame. Data may be transferred through one or more data frames. Transferring of the transfer ready frame XFER_RDY Frame and transferring of the data frame may be repeated until all data to be stored in the data storage device 120 is transferred.

If storing of data transferring from the initiator 110 is completed, the data storage device 120 transfers to the initiator 110 a response frame indicating that a command is completed. The response frame may include tag information (Initiator Port Transfer Tag=Q) on a command. After the response frame is transferred, the data storage device 120 may delete tag information on a corresponding command in a tag buffer (or, a tag register).

In FIG. 1, there is shown an example that the initiator 110 and the data storage device 120 are interconnected via the SCSI interface. With another embodiment, the initiator 110 and the data storage device 120 are able to be interconnected via the SAS interface. The SAS interface connects the initiator 110 and the data storage device 120 via SCSI command sets and utilizes a serial transfer manner using a single signal line. Accordingly, the above-described tag duplication check may be applied identically to a user device where the initiator 110 and a data storage device 120 are interconnected via the SAS interface.

Figure 2:
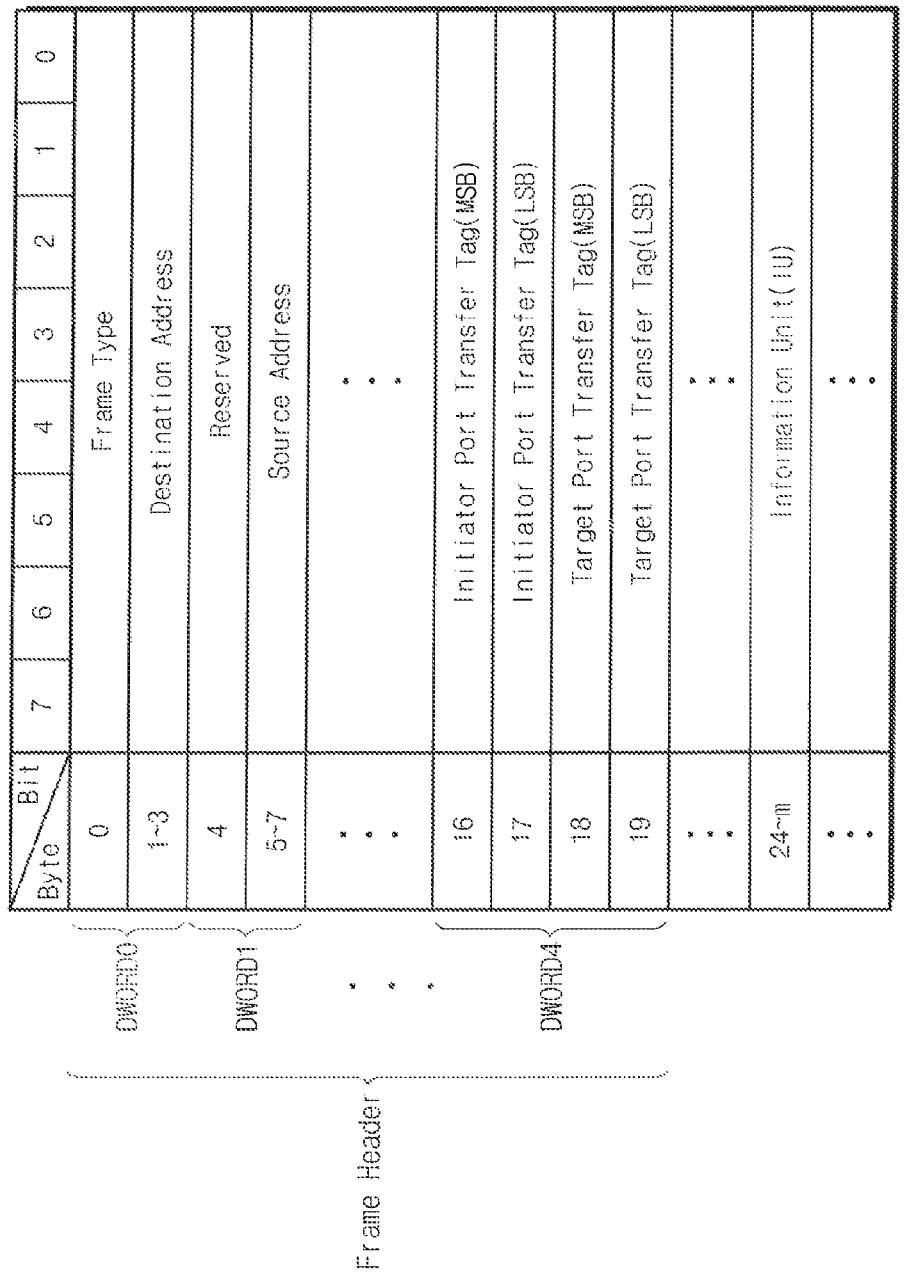
FIG. 2 is a diagram showing a frame format of SCSI and SAS interfaces.

FIG. 2 is a diagram showing a frame format of SCSI and SAS interfaces, and FIG. 3 is a diagram showing frame types of SCSI and SAS interfaces.

An initiator 110 and a data storage device 120 interconnected via an SCSI/SAS interface may transfer a command and a response in a frame unit. A frame may be formed to have dozens of bytes in size as a frame unit, for example. The initiator 110 and the data storage device 120 interconnected via an SCSI/SAS interface may transfer a frame in a double word (DWORD) unit, that is, 32-bit unit. A frame may include various types of information. For example, a frame may include a frame header including management information of the frame, information unit (IU), and other information. In an exemplary embodiment, as described in FIG. 2, the frame header may be formed of 20 bytes DWORD0 to DWORD4, and the information unit IU.

The frame header, for example, may include frame type information indicating whether a current frame has a type, a destination address indicating a device to which a frame is to be transferred, and a source address indicating a device of transferring a frame. The frame header may further include an Initiator Port Transfer Tag IPTT, indicating identifier information with which an initiator provides a command to be transferred, and a Target Port Transfer Tag TPTT, indicating identifier information with which a data storage device provides a response of a corresponding command. The IPTT may be formed of one MSB byte and one LSB byte, and the PTPP may be formed of one MSB byte and one LSB byte.

Contents stored in the information unit IU may differ according to frame types which will be described with reference to FIG. 3 later. Data to be stored in a data storage device (or, a target) may be stored in the information unit IU of a data frame transferred from an initiator at a write operation. Data to be transferred to an initiator may be stored in the information unit IU of a data frame transferred from a data storage device (or, a target) at a read operation. Information unit IU in a transfer ready frame XFER_RDY Frame of FIG. 1, which a data storage device (or, a target) transfers in response to a write command of an initiator, may include information such as a size of a data buffer, data length information, or the like. Information unit IU of a response frame from a data storage device (or, a target) may include information such as response information on a command or task, status information, or the like.

Information unit IU of a command frame from an initiator may include a command descriptor block CDS, which includes a command or a logical block address. Information unit IU of a task frame from an initiator may include management information on a task or command transferred via a command frame. The task management information may include information of managing commands such as task/command interrupt, task/command delete, task/command reset, etc.

Referring again to FIG. 2, tag information IPTT may be included in command and task frames transferred from the initiator 110. The initiator 110 is able to provide a plurality of commands which is discriminated by the tag information. Accordingly, the data storage device 120. Accordingly, when command and task frames are received, the data storage device 120 may confirm/check tag information of received frames. That is, the data storage device 120 may make a tag duplicate check, which will be more fully described with reference to FIG. 5.

Figure 4:
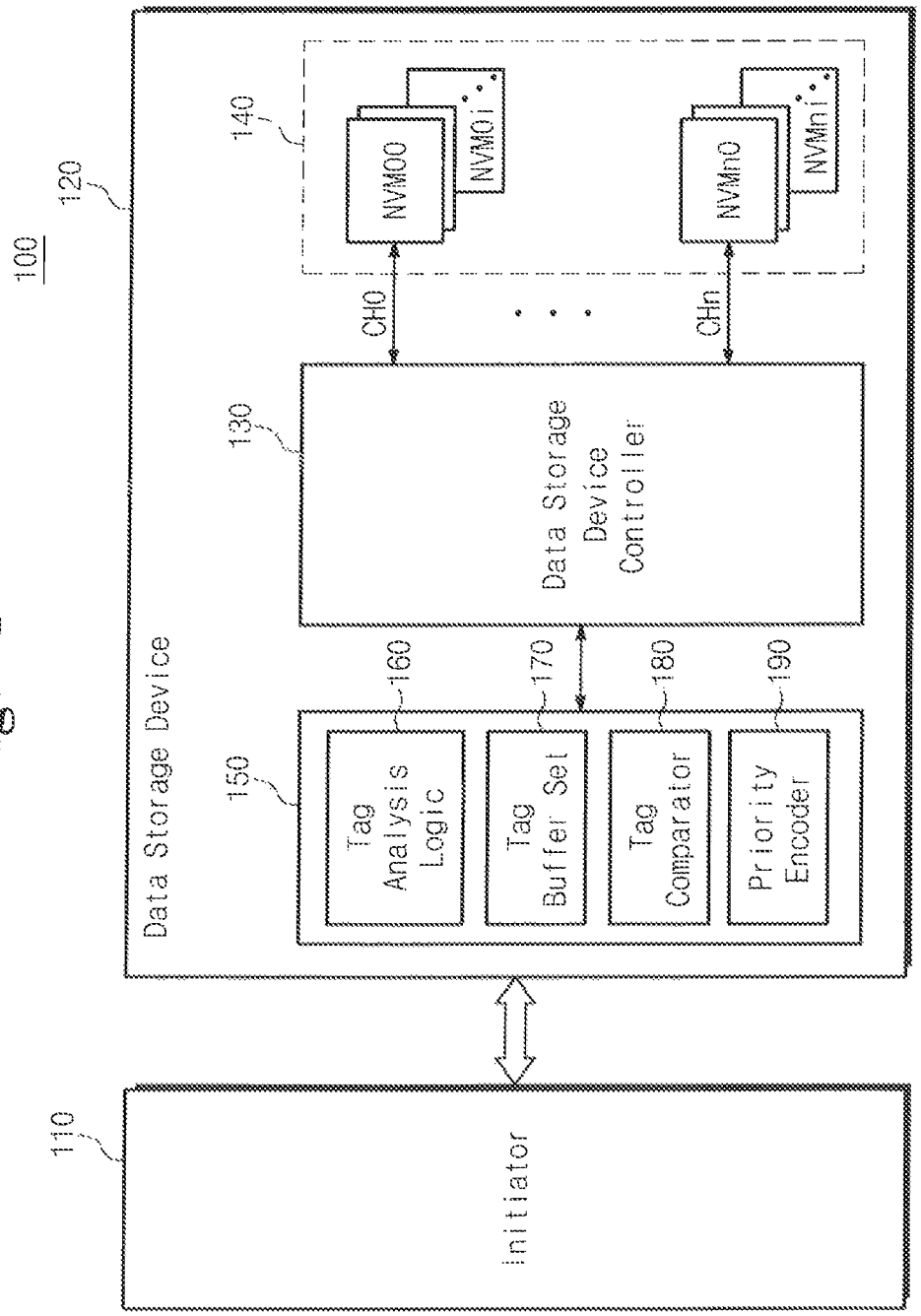
FIG. 4 is a block diagram showing a data storage device according to an exemplary embodiment of the inventive concept.

FIG. 4 is a block diagram showing a data storage device according to an exemplary embodiment of the inventive concept.

Referring to FIG. 4, a user device 100 may include an initiator 110 and a data storage device 120. The initiator 110 is configured to control the data storage device 120. The user device 100, for example, may include portable electronic devices, such as cellular phones, PDA, PMP, MP3 player, digital camera, digital camcorder, etc., and electronic devices such as personal/portable computer, server system, HDTV, navigation system, etc. The data storage device 120 operates responsive to a command (or, request) of the initiator 110. The data storage device 120 retains stored data in a power-off state.

The data storage device 120, for example, may be one of various memory cards (SD card, CF card, MMC, embedded MMC, etc.), USB memory device, a Hard Disk Drive (HDD), or a Solid State Drive (SSD). In FIG. 4, there is shown an example that the data storage device 120 is the SSD.

The data storage device 120 includes a data storage device controller 130, a storage medium 140, and a tag duplicate check unit 150. The data storage device controller 130 controls the storage medium 140 in response to a command (or, a request) from the initiator 110. For example, the data storage device controller 130 controls read, write, and erase operations of the storage medium 140 in response to access requests of the initiator 110.

The data storage device controller 130 is connected with the storage medium 140 via a plurality of channels CH0 to CHn. The storage medium 140 may include a plurality of non-volatile memory devices. Each of the channels CH0 to CHn is connected with a plurality of non-volatile memory devices. For example, the channel CH0 is connected with a plurality of non-volatile memory devices NVM00 to NVM0i. The channel CHn is connected with a plurality of non-volatile memory devices NVMn0 to NVMni.

The storage medium 140, for example, may be formed of a plurality of flash memory devices. However, the present general inventive concept is not limited thereto. That is, the storage medium 140 may be non-volatile memory devices. For example, the storage medium 140 may be formed of any one of non-volatile memory devices such as a Phase change RAM (PRAM), a Ferroelectric RAM (FRAM), a Magnetic RAM (MRAM), and the like. Each of flash memory devices constituting the storage medium 140 is able to storing single-bit data or multi-bit data.

The tag duplicate check unit 150 of the data storage device 120 is configured to determine whether tag information of a frame from the initiator 110 is duplicated. The tag duplicate check unit 160 may include tag analysis logic 160, a tag buffer set 170, a tag comparator 180, and a priority encoder 190.

If a frame from the initiator 110 is received, the tag analysis logic 160 determines whether the received frame is a command frame or a task frame. When a command frame or a task frame is received, the tag anaiysis logic 160 generates tag check data based on tag information of the received frame. The structure of the tag check data will be more fully described with reference to FIG. 6.

The tag comparator 180 compares tag check data (hereinafter, referred to as new tag check data) newly generated by the tag analysis logic 160 with tag check data (hereinafter, referred to as old tag check data) which has been previously received and stored in a tag buffer of the tag buffer set 170. The tag comparator 180 may perform a tag check data comparing operation with respect to the corresponding initiator.

If the new tag check data is identical to the old tag check data, the tag comparator 180 issues the error interrupt to the data storage device controller 130. On the other hand, if the new tag check data is not identical to the old tag check data, it is stored in an empty tag buffer of the tag buffer set 170.

The priority encoder 190 selects an empty tag buffer of the tag buffer set 170 according to the control of the tag analysis logic 160. The priority encoder 190 selects an empty tag buffer by searching valid bits of tag check data stored in the tag buffer set 170. The tag analysis logic 160 may transfer/store the new tag check data into/at a tag buffer selected by the priority encoder 190.

The data storage device 120 according to exemplary embodiments of the inventive concept includes a tag duplicate check unit 150 which is configured to judge whether tag information of a frame transferred from the initiator 110 is repeatedly received. The tag duplicate check unit 150 may be formed of hardware. The tag duplicate check unit 150 is formed of the tag analysis logic 160, the tag buffer set 170, the tag comparator 180, and the priority encoder 190.

In the event that tag information of a frame transferred from the initiator 110 duplicates, the tag duplicate check unit 150 notifies the data storage device controller 130 of the error. On the other hand, if tag information of a frame transferred from the initiator 110 does not duplicate, the tag duplicate check unit 150 manages the transferred tag as a valid tag such that the controller 130 performs a corresponding command.

In accordance with exemplary embodiments of the inventive concept, since the tag duplicate check unit 150 performs the tag duplicate check operation on a frame transferred from the initiator 110, there is reduced the overhead caused when the controller 130 performs the tag duplicate check operation. This enables a response speed to a request command of an initiator to be speeded up and the performance of a user device using the data storage device 120 to be enhanced.

Figure 5:
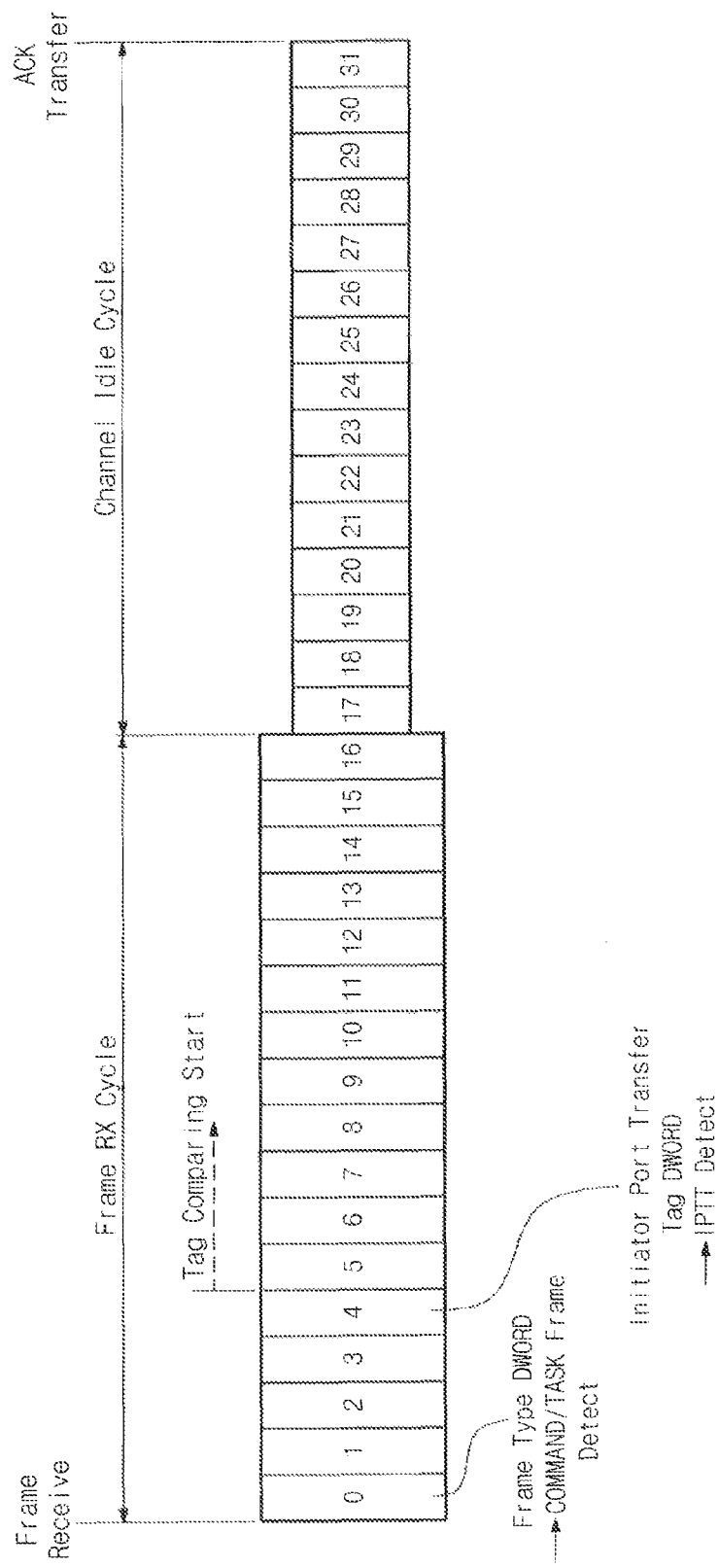
FIG. 5 is a diagram showing a tag duplicate checking operation according to an exemplary embodiment of the inventive concept.

FIG. 5 is a diagram showing a tag duplicate checking operation according to an exemplary embodiment of the inventive concept.

Referring to FIGS. 4 and 5, there is shown a data transmitting/receiving flow where a data storage device 120 receives a command frame or a task frame from an initiator 110 and sends a response/acknowledge frame in response to the received command/task frame. As an example, FIG. 5 illustrates the frame transmitting/receiving flow when the data storage device 120 receives a command frame, for example, a CDB32 command frame. In this case, the data storage device 120 may receive the CDB32 command frame during a frame Rx cycle, for example, 17 cycles. If receiving of the CDB32 command frame is completed, the data storage device 120 has a channel idle cycle until it sends a response to the CDB32 command frame.

A tag duplicate check unit 150 of the data storage device 120 performs the tag duplicate check operation in response to an input of the CDB32 command frame. The tag duplicate check operation may include a frame search operation to determine whether a received frame is a command frame and a tag compare operation to determine whether a tag of a received frame is duplicated. The frame search operation may be accomplished by searching a frame header of a received frame. The tag compare operation may be made in the same manner as described above, for example, using tag check data.

Prior to perform the tag compare operation, the tag duplicate check unit 150 determines whether a frame provided from an initiator is a command frame. As described above, the data storage device 120 may receive a frame by a double word (DWORD) unit. If a frame is received, the tag analysis logic 160 confirms the first DWORD DWORD0 of the received frame. The first DWORD DWORD0 includes frame type information indicating a type of a current frame. Accordingly, the tag analysis logic 160 performs a frame search operation when the first DWORD DWORD0 is received. That is, the tag analysis logic 160 detects whether a received frame is a command frame, depending upon frame type information.

If the received frame is determined to be a command frame, the tag analysis logic 160 generates the tag check data based on the received frame. As described in FIG. 2, the fifth double word DWORD4 includes IP 11 and TPTT. Accordingly, the tag analysis logic 160 generates the tag check data when the fifth double word DWORD4 is received. If the tag check data is generated, the tag comparator 170 performs the tag compare operation based on the tag check data. That is, the tag comparator 170 determines whether the same tag is received, depending upon the tag check data.

In an exemplary embodiment, there is described the tag duplicate check when a command frame is provided to the data storage device 120. But, it is well understood that when a task frame is received the tag duplicate check is made in the same manner as made when a command frame is received.

Figure 6:
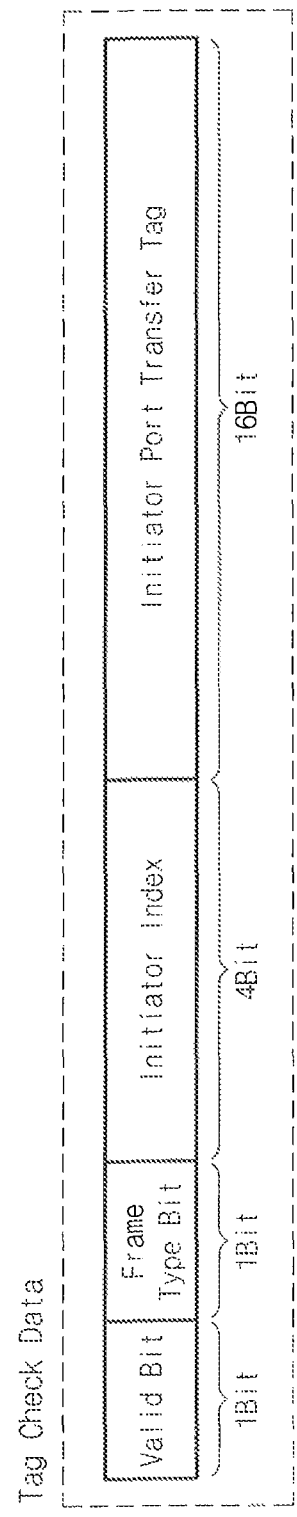
FIG. 6 is a diagram showing a bitmap of tag check data according to an exemplary embodiment of the inventive concept.

FIG. 6 is a diagram showing a bitmap of tag check data according to an exemplary embodiment of the inventive concept.

Referring to FIG. 6, tag check data includes a valid bit, a frame type bit, an initiator index, and Initiator Port Transfer Tag (IPTT) information.

The valid bit indicates whether a current tag buffer 170 (refer to FIG. 4) is in use. For example, the valid bit being data '1' indicates that valid tag check data is stored in the current tag buffer. On the other hand, the valid bit being data '0' indicates that invalid tag check data is stored in the current tag buffer. New tag check data is stored in the current tag buffer when the valid bit is data '0'. As described in FIG. 4, a priority encoder 190 (refer to FIG. 4) selects an invalid tag buffer by searching valid bits of tag check data stored in the tag buffer set 170.

The tag information is sent through a command/task frame. Accordingly, tag analysis logic 160 (refer to FIG. 4) discriminates a type of a frame including tag information. The frame type bit indicates a type of a transferred frame. For example, if the frame type bit is data '1', tag information corresponds to a command frame. On the other hand, if the frame type bit is data '0', tag information corresponds to a task frame.

The same tag information is able to be sent to a data storage device from different initiators. Accordingly, the tag analysis logic 160 discriminates an initiator which sends tag information. The initiator index indicates information of an initiator which sends tag information. The IPTT information indicates tag information which is sent upon receiving of a frame.

The tag check data is generated by the tag analysis logic 160. If a frame is received by a data storage device 120, the tag analysis logic 160 generates tag check data by extracting information, such as the frame type information, the initiator information, and the IPTT information, from the received frame. The tag check data may be generated with respect to respective received tags.

Figure 7:
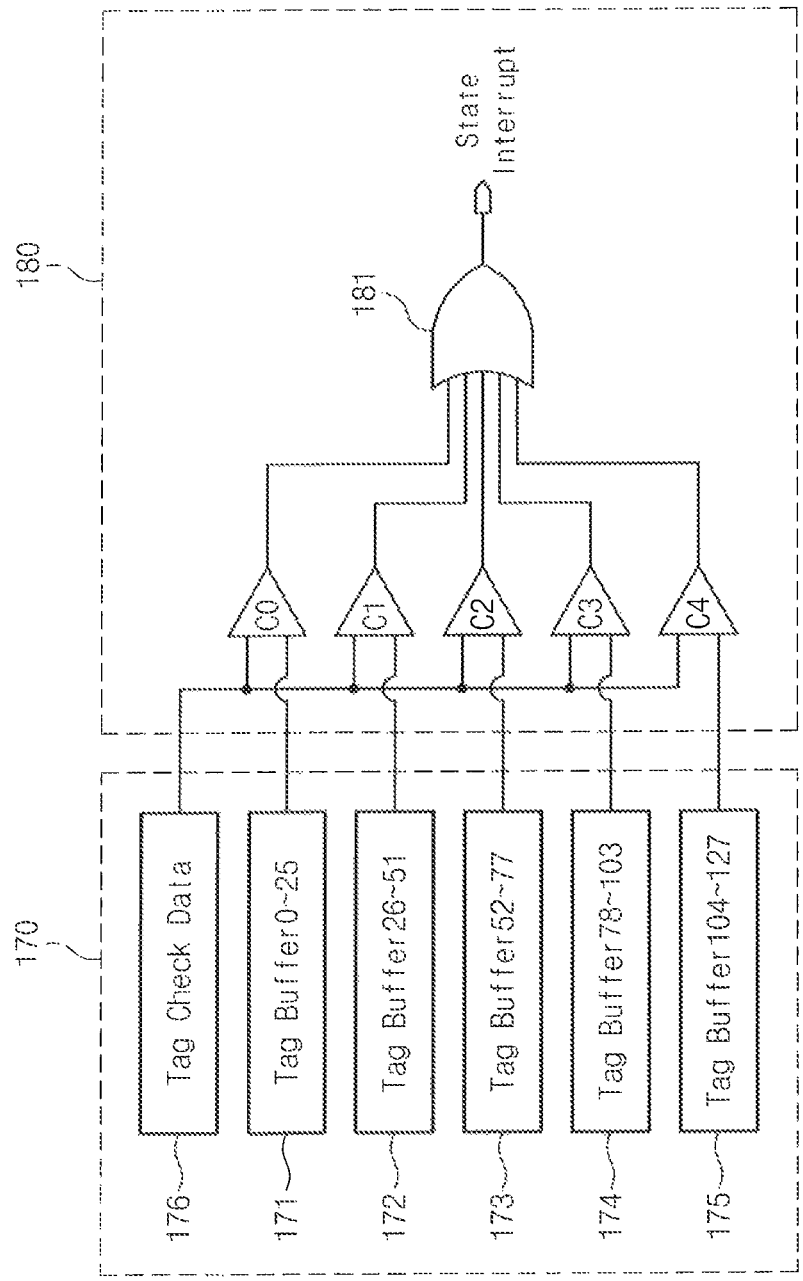
FIG. 7 is a block diagram showing a tag buffer set and a tag comparator according to an exemplary embodiment of the inventive concept.

FIG. 7 is a block diagram showing a tag buffer set and a tag comparator according to an exemplary embodiment of the inventive concept.

A tag comparator 180 includes a plurality of comparators C0 to C4 and an OR gate 181. The number of comparators in a tag duplicate unit 150 (refer to FIG. 4) may be changed according to a frame transmitting/receiving cycle. As an example, there is described the number of comparators needed when a CDB32 command frame is received.

As illustrated in FIG. 5, it is assumed that a sending/receiving cycle of the CDB32 command frame is formed of a total of 32 cycles. That is, a sending/receiving cycle of the CDB32 command frame is formed of 17 cycles needed to receive a frame and 15 cycles as idle cycles. It is possible that a maximum tag cycle (or, a maximum queue depth), during which a data storage device 120 (refer to FIG. 4) further receives tags without completion of a received command, may be 128.

During the sending/receiving cycle of the CDB32 command frame, the tag duplicate unit 150 may perform a tag comparison operation after the fifth cycle where tag information is received. That is, the tag comparison operation may be conducted during 27 cycles. Accordingly, five comparators may be used to perform a comparison operation with a number of tags, for example, 127 tags during 27 cycles.

In accordance with embodiments of the inventive concept, the number of tag comparators necessary for tag duplicate check is determined by dividing the maximum receivable tag number by a value of (a frame receiving cycle number minus a tag information receiving cycle number plus an idle cycle number) and performing the raising operation with respect to a division result.

The maximum receivable tag number represents the maximum number (or, the maximum queue depth) of tags which a data storage device further receives without completion of a received command. The idle cycle number means a cycle number from a time when receiving of a frame is completed to a time when a response to the received frame is send.

Referring again to FIG. 7, the five comparators C0 to C4 are respectively connected with 26 tag buffers of the tag buffer set 170 in order to compare tag check data via the five comparators C0 to C4 during 27 cycles. That is, the comparator C0 compares new-received tag check data 176 with tag check data stored in each of tag buffers 171, respectively. The comparator C1 compares new-received tag check data 176 with tag check data stored in each of tag buffers 172, respectively. Each of the comparators C2 to C4 compares new-received tag check data 176 with tag check data stored in each of corresponding tag buffers 173 to 175, respectively.

If new-received tag check data 176 is determined to be identical to tag information of previously-received tag check data, the tag comparator 180 generates an error interrupt to the controller 130. On the other hand, if newly received tag check data 176 is determined to be different from tag information of previously-received tag check data, new-received tag check data 176 may be stored in an empty tag buffer of tag buffers 171 to 175.

Figure 8:
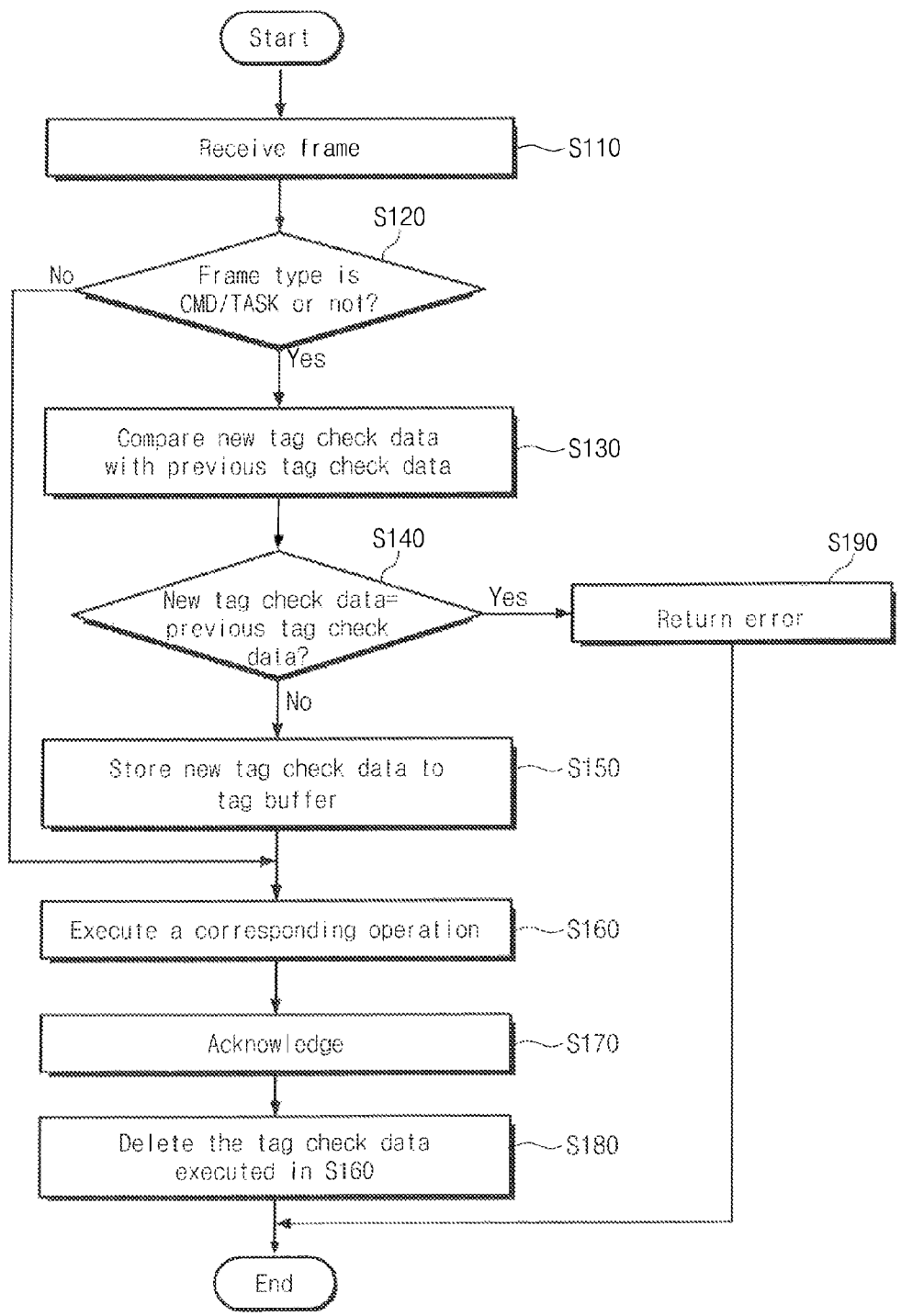
FIG. 8 is a flow chart showing an operation of a data storage device according to an exemplary embodiment of the inventive concept.

FIG. 8 is a flow chart showing an operation of a data storage device according to an exemplary embodiment of the inventive concept. An operation of a data storage device will be more fully described with reference to FIGS. 4 to 8.

In operation S110, a data storage device 120 receives a frame sent from an initiator 110. In operation 5120, tag analysis logic 160 determines whether the received frame is a command frame or a task frame. A frame type may be determined according to frame type information of the received frame. If the received frame is determined not to be the command/task frame, the procedure goes to operation S160 in order for the data storage device 120 to perform a corresponding operation.

If the received frame is determined to be the command/task frame, tag analysis logic 160 generates tag check data in order to perform a tag comparison operation. The tag check data is generated depending upon IPTT information of the received frame. If the tag check data is generated by the tag analysis logic 160, in operation S130, a tag comparator 180 performs a tag comparison operation. That is, the tag comparator 180 compares tag check data new generated by the tag analysis logic 160 with tag check data stored in the tag buffer set 170.

Further, in operation S140, the tag comparator 180 determines whether a tag is duplicated, depending upon the comparison result.

In the event that new tag information is identical to previous tag information, in operation S190, the tag comparator 180 generates an error interrupt to the controller 130. If there is received an interrupt indicating that the same tag is received, the controller 130 resets a tag buffer set 170. The controller 130 sends an error to the initiator 110. In the event that new tag information is not identical to previous tag information, in operation 3150, the tag analysis logic 160 stores new-generated tag check data in an empty tag buffer of the tag buffer set 170. In this case, the new-generated tag check data may be stored (or, shifted) in (or, into) an empty tag buffer which is selected by a priority encoder 190. Afterward, the procedure goes to operation S160.

In operation S160, the controller 130 performs a corresponding command. If the corresponding command is completed, in operation S170, the controller 130 sends a response to the corresponding command. For example, the controller 130 may send a response frame to the initiator 110 which sends the corresponding command. The response frame includes IPTT information. Accordingly, in operation S180, the tag analysis logic 160 deletes corresponding tag check data in synchronization with the response frame. For example, the tag analysis logic 160 may change into '0' a valid bit of tag check data corresponding to a command which is performed.

In accordance with embodiments of the inventive concept, since tag duplicate check of a frame sent from an initiator 110 is conducted by the tag duplicate unit 150, it is possible to reduce the overhead of the controller 130 caused when the tag duplicate check is conducted. This enables the data storage device 120 to respond to a command from an initiator 110 within faster time, thus improving the performance of a user device 100 using the data storage device 120.

Figure 9:
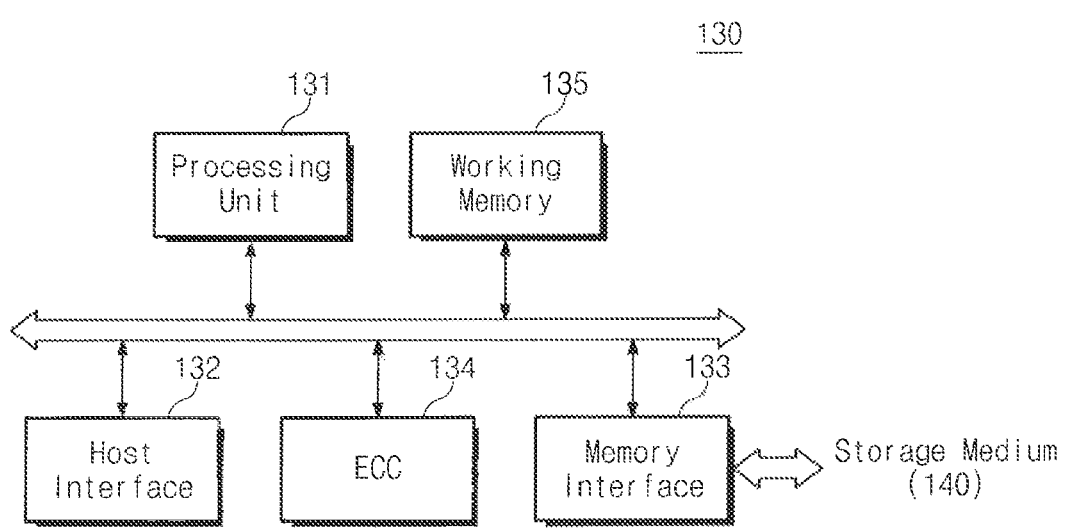
FIG. 9 is a block diagram showing a controller of a data storage device in FIG. 4.

FIG. 9 is a block diagram showing a controller of a data storage device of FIG. 4.

Referring to FIG. 9, a controller 130 includes a processing unit 131, a host interface 132, a memory interface 133, an ECC unit 134, and a working memory 135. However, the present general inventive concept is not limited thereto. For example, the controller may further include a ROM to store code data necessary for booting, a buffer memory controller to control a buffer memory device, and the like.

The processing unit 131 may be a central processing unit or a micro-processor. The processing unit 131 controls an overall operation of the controller 130. The processing unit 131 is configured to drive firmware for controlling the controller 130. The firmware may be loaded and driven on the working memory 135.

The host interface 132 provides an interface between the host 110 and the controller 130. The host 110 and the controller 130 are interconnected via one of various standardized interfaces. In another embodiment, the host 110 and the controller 130 are interconnected via plural interfaces of various standardized interfaces. The standardized interfaces may include interface manners, such as SCSI, SAS, FC, IEEE 1394, etc., which utilize a SCSI command set.

In a data storage device where a storage medium 140 is formed of memory devices, the memory interface 130 provides an interface between the controller 130 and the storage medium 140. For example, data processed by the processing unit 131 is stored in the storage medium 140 via the memory interface 133. In another embodiment, data stored in the storage medium 140 is provided to the processing unit 131 via the memory interface 133. The memory interface 133 may include a memory controller controlling the storage medium 140. The memory interface 140 provides an interface between the controller 130 and a buffer memory device (not shown).

The ECC unit 134 recovers data damaged due to various causes. For example, the ECC unit 134 is configured to detect and recover errors of data read out from the storage medium 140. In FIG. 9, the ECC unit 134 is illustrated as an element of the controller 130. But, the ECC unit 134 is able to be provided as an element of the storage medium 140.

The working memory 135 stores firmware for controlling the controller 130 and meta data necessary for driving the firmware. The firmware and meta data may be driven by the processing unit 131. The working memory 135 may include one of a cache memory, DRAM, SRAM, PRAM, flash memory, and the like. In a data storage device where a storage medium 140 is formed of memory devices, a flash translation layer FTL is stored in the working memory 135.

Figure 10:
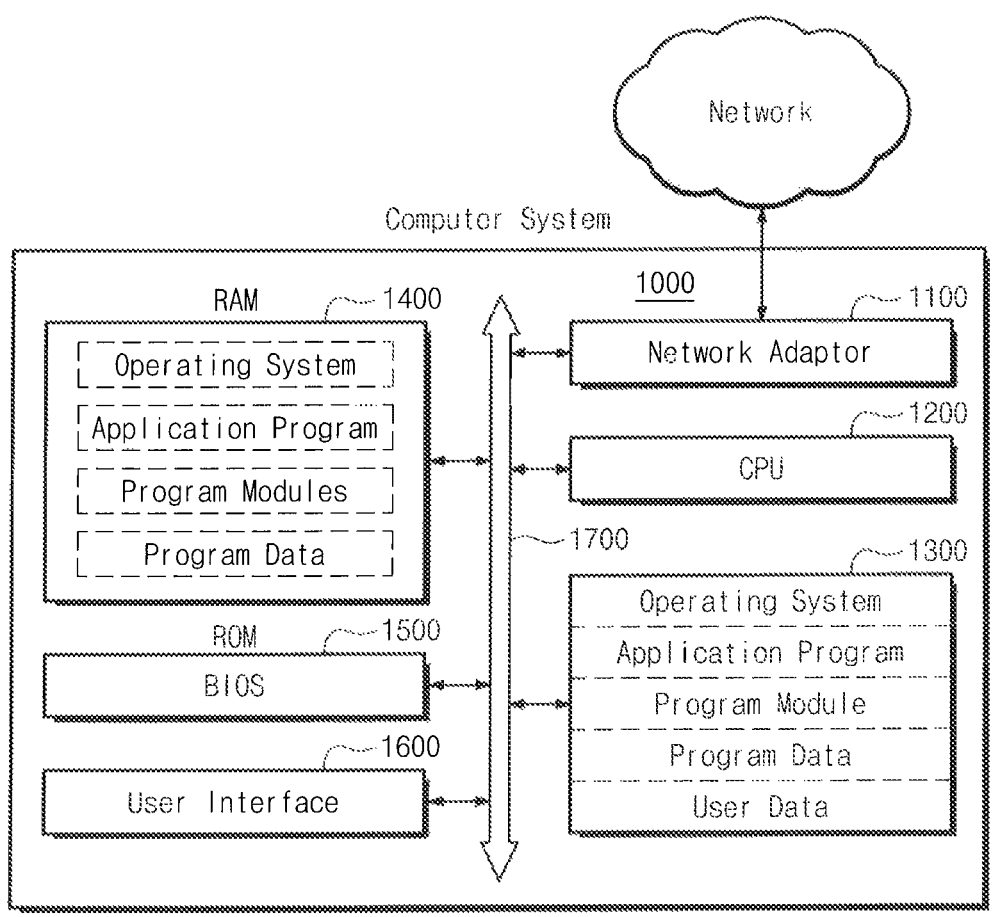
FIG. 10 is a block diagram showing a computer system including a data storage device according to an exemplary embodiment of the inventive concept.

FIG. 10 is a block diagram showing a computer system including a data storage device according to an exemplary embodiment of the inventive concept.

A computer system 1000 includes a network adaptor 1100, a CPU 1200, a data storage device 1300, a RAM 1400, a ROM 1500, and a user interface 1600.

The network adaptor 1100 provides an interface between the computer system 1000 and external networks through a wired or wireless communication. The CPU 1200 performs a general operation for driving an operating system or an application program which is stored in the RAM 140. The data storage device 1300 stores overall data necessary for the computer system 1000. For example, the data storage device 1300 may store an operating system, an application program, program modules, program data, user data, etc.

The RAM 1400 may be used as a working memory of the computer system 1000. Upon booting, the OS, application program, program modules, and program data necessary to drive programs are loaded onto the RAM from the data storage device 1300. In the ROM 1500, there is stored a Basic Input/Output System (BIOS) which is activated before the OS is driven in a booting operation. Information exchange between the computer system 1000 and a user is made via the user interface 1600.

The computer system 1000 may further comprise a battery, a modem, and the like. Although not illustrated in FIG. 10, the computer system 1000 further includes an application chipset, a camera image processor (CIS), a mobile DRAM, and the like.

The data storage device 1300 may be formed of a Solid State Drive (SSD), a Hard Disk Drive (HDD), a MultiMedia Card (MMC), a Secure Digital (SD) card, a micro SD card, a memory stick, an ID card, a PCMCIA card, a chip card, a USB card, a smart car, a Compact Flash (CF) card, etc. The data storage device 1300 may correspond to the storage medium 140, and the CPU 1200 may correspond to the data storage device controller 130.

Figure 11:
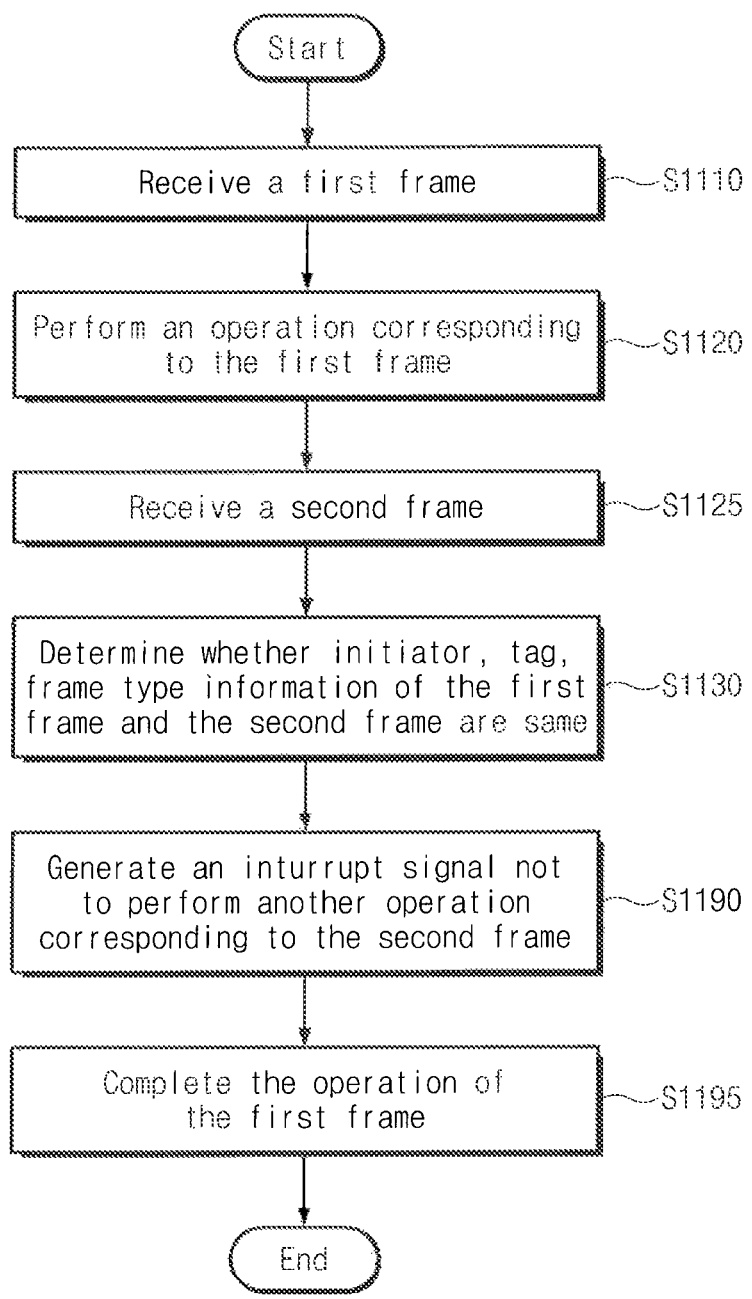
FIG. 11 is a flow chart illustrating an operation of a data storage device according to an exemplary embodiment of the present general inventive concept.

Referring to FIG. 11, a data storage device receives a first frame from an external device, for example, an initiator, at operation S1110. The data storage device perform an operation corresponding to the first frame at operation S1120, such as a reading, writing, or erasing operation on a storage medium of the data storage device. Before completing the operation corresponding to the first frame, the data storage device may receive a second frame at operation S1125. The data storage device may compare initiator, tag, and frame type information of the first frame and the second frame and then determine whether the initiator, tag, and frame type of the first frame is the same as the initiator, tag, and frame type of the second frame at operation S1130. According to the comparison or the determination of operation S1130, the data storage device generates an interrupt signal not to perform an operation corresponding to the second frame at operation S1100. If the operation corresponding to the first frame is finished, this method is completed at operation S1105.

It is possible that operations S1130 and S1190 may not perform when the operation corresponding to the first frame is finished when the second frame is received. It is also possible that operation 1195 may be finished during or before operation 1190. The initiator, tag, and frame type of the first frame may be stored in a memory thereof to be used to be compared with the initiator, tag, and frame type of the second frame until the second frame is received or until the operation corresponding to the first frame is finished.

The present general inventive concept can also be embodied as computer-readable codes on a computer-readable medium. The computer-readable medium can include a computer-readable recording medium and a computer-readable transmission medium. The computer-readable recording medium is any data storage device that can store data as a program which can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A data storage device comprising:
a data storage device controller configured to control a storage medium and to receive a frame from an initiator; and
a tag duplicate check unit to determine the initiator, tag information, and a type of the frame according to the received frame, and to provide an interrupt to the data storage device controller if a same frame type and same tag information are received from the initiator, the tag duplicate check unit comprising:
a tag analysis logic to generate tag check data of the received frame,
a tag buffer set to store tag check data corresponding to a command not being completed,
a tag comparator to check a duplicate of tag check data, and
a priority encoder to select an empty tag buffer of the tag buffer set,
wherein the tag duplicate check unit is configured to determine whether the received frame is a command frame or a task frame,
the tag comparator compares the generated tag check data with tag check data stored in the tag buffer set,
when the generated tag check data is different from tag check data stored in the tag buffer set, the tag analysis logic stores the generated tag check data in the tag buffer set, and
the tag analysis logic invalidates a valid bit of tag check data being completed and stored in the tag buffer set in synchronization with completion notification which the data storage device controller sends to the initiator.

2. The data storage device of claim 1, wherein the tag analysis logic determines a frame depending upon frame type information of the sent frame.

3. The data storage device of claim 1, wherein the tag analysis logic generates tag check data when the received frame is a command frame or a task frame, the tag check data including type information of the received frame, information of the initiator sending the frame, and tag information.

4. The data storage device of claim 3, wherein the tag analysis logic generates the tag check data based on tag information of the received frame.

5. The data storage device of claim 1, wherein when the generated tag check data is identical to tag check data stored in the tag buffer set, the tag comparator provides an interrupt to the data storage device controller.

6. The data storage device of claim 1, wherein the tag comparator compares with the generated tag check data based on valid tag check data in the tag buffer set.

7. The data storage device of claim 1, wherein the priority encoder selects an empty tag buffer of the tag buffer set based on a valid bit of tag check data stored in the tag buffer set.

8. An operating method of a data storage device, which comprises a data storage device controller to control a storage media and a tag duplicate check unit, the operating method comprising:
receiving a frame from an initiator by the tag duplicate check unit; determining a type of the received frame; generating tag check data based on the received frame; comparing the generated tag check data with previously stored tag check data; providing an interrupt to the data storage device controller by the tag duplicate check unit, when the generated tag check data is identical to previously stored tag check data storing the generated tag check data when the generated tag check data is different from the previously stored tag check data; invalidating a valid bit of the previously stored tag check data in synchronization with completion notification which the data storage device controller sends to the initiator; after the generating is made, notifying an error generation to the initiator by the data storage device controller; and deleting the previously stored tag check data, wherein the generating and the comparing are made when the received frame is a command frame or a task frame.

9. The operating method of claim 8, wherein the determining is carried out prior to the comparing.

10. The operating method of claim 8, wherein the determining is carried out after frame type information of the received frame is received.

11. The operating method of claim 8, wherein the generating includes generating type information of the received frame, information of an initiator sending the frame, and tag information.

* * * * *